United States Patent [19]

Tomsu

[11] 4,379,520

[45] Apr. 12, 1983

[54] TEMPERATURE REGULATING SYSTEM FOR AIR CONDITIONING OR HEATING PLANTS, PREFERABLY IN RAILWAY VEHICLES

[75] Inventor: Peter Tomsu, Vienna, Austria

[73] Assignee: Alex Friedmann Kommanditgesellschaft, Vienna, Austria

[21] Appl. No.: 290,211

[22] Filed: Aug. 5, 1981

[30] Foreign Application Priority Data

Aug. 6, 1980 [AT] Austria .................................. 4057/80

[51] Int. Cl.³ ........................ G05D 23/00; G01K 7/00
[52] U.S. Cl. ...................................... 236/49; 236/94; 374/170
[58] Field of Search .................. 73/362 AR; 364/557, 364/556; 236/94, 49; 165/11 R; 374/170, 184

[56] References Cited

U.S. PATENT DOCUMENTS

| | | | |
|---|---|---|---|
| 4,176,556 | 12/1979 | Takenaka | 374/170 |
| 4,206,648 | 6/1980 | Tuska et al. | 73/362 AR |
| 4,277,975 | 7/1981 | Pinkham | 374/170 |
| 4,315,413 | 2/1982 | Baker | 73/362 AR |

OTHER PUBLICATIONS

Bauteile Report, vol. 12, No. 6, 12/1977.

*Primary Examiner*—William E. Wayner
*Attorney, Agent, or Firm*—Watson, Cole, Grindle & Watson

[57] ABSTRACT

In order to permit in a simple manner the use of a digital processing unit in a regulating system for an air conditioning or heating plant, each temperature sensor of a temperature-measuring device is connected to a capacitor so as to charge it with a current proportional to the measured temperature. The capacitor is connected to one input of a comparator, and a reference voltage is applied to the other input. The output of the comparator is applied to an input of a digital processing unit which, at the start of the temperature measurement, will discharge the capacitor over a predetermined period and will then, at uniform time intervals, check the output signal supplied by the comparator for change. The number of samplings from the end of capacitor discharge until the time a change in the comparator output occurs is available as a digital value corresponding to the measured temperature.

6 Claims, 4 Drawing Figures

1

TEMPERATURE REGULATING SYSTEM FOR AIR CONDITIONING OR HEATING PLANTS, PREFERABLY IN RAILWAY VEHICLES

BACKGROUND OF THE INVENTION

The present invention relates to a temperature-regulating system for, respectively, air conditioning and heating plants, preferably in railway vehicles, the system including a temperature-measuring device having at least one temperature sensor.

DESCRIPTION OF THE PRIOR ART

In a known temperature-regulating system of the aforenamed category, a control circuit is provided for generating a signal which serves to regulate the temperature to be monitored, which circuit contains as essential elements, apart from the temperature sensor proper, a sawtooth-wave generator and a comparator. The signal delivered by the sawtooth-wave generator is applied to one input of the comparator and the analog signal delivered by the temperature sensor, which is proportional to the temperature, is applied to the other input of the comparator. The comparator is arranged in the circuit in such way that the voltage supplied by the sawtooth-wave generator will be cut off at a height dependent upon the magnitude of the temperature-proportional signal from the temperature sensor, so that the width of the individual saw-tooth waves, as truncated at the height of the temperature-proportional signal, will determine the length of the rectangular pulses at the output of the comparator. These rectangular pulses serve as signals for switching the air conditioning or heating plant proper, which may thus be regulated in a manner proportional to temperature. However, this known temperature regulating system has the decisive disadvantage that entire portions of the control circuit must be replaced in order to take into consideration different and variable factors that exert an influence upon the required relationship between temperature and functioning of the air conditioning or heating plant, and it would altogether be possible only at very large expenditure for circuit technology to have such relationship sensitive to the influence of more complicated factors. Since, particularly in railway vehicles, there is only limited space available for air conditioning plants or heating plants and also the temperature-regulating system required for same, such additional expenditure for circuitry is, apart from additional cost for manufacture and installation, very unfavorable.

The present invention proceeds from the idea of using a digital processing unit, such as a microprocessor, for a temperature-regulating system of the initially named category, which will provide some decisive advantages when compared with the aforenamed known design. It will thus be possible to allow different and variable influences to act upon the relationship between temperature and the functioning of the air conditioning or heating plant simply by changing the programs predetermined by the digital processing unit and without requiring any changes in the circuitry. The entire expenditure for circuitry will thus be considerably reduced, and this will have a very favorable effect, particularly with the limited space available in railway vehicles.

To process a signal in a digital processing unit, for instance the temperature-proportional signal delivered by the temperature sensors, this signal must be delivered to the corresponding input of the processing unit in digital format, but the temperature sensors or, respectively, the temperature-measuring devices of the aforenamed known design are incapable of doing so.

In a different context, digital thermometers and digital temperature regulators have become known in which the respective temperature-proportional currents or voltages supplied via temperature sensors are converted in a directly connected IC-module into a digital control signal corresponding to the temperature measured by the temperature sensor. The required IC-module makes the design of this known digital temperature-measuring device complicated and expensive; a great disadvantage, particularly when used in temperature-regulating devices of air conditioning plants and heating plants in railway vehicles, this being due to the relatively high number of such temperature-measuring devices that may be required under certain circumstances.

SUMMARY OF THE PRESENT INVENTION

It is an object of the present invention to improve a temperature-regulating device of the initially named category in such a manner that use of a digital processing unit for the regulating device will be possible in a simple manner and the expenditure for the regulating system and for the temperature-measuring device in particular will be kept low. According to the present invention, this is attained by connecting the temperature sensor to a capacitor which is thereby charged with a temperature-proportional current; by connecting the capacitor to one input of a comparator, with a reference voltage applied to the other input of the comparator which changes its output signal value upon the capacitor voltage reaching the reference voltage; by applying the output signal of the comparator to the input of a digital processing unit such as a microprocessor, which is so arranged in the circuit that at the start of temperature measurement, and controlled by the processing unit, the capacitor will discharge over a predetermined period; furthermore, by then enabling the digital processing unit to check the comparator-supplied output signal at equal time intervals for change, and by assigning the number of samplings performed from the end of capacitor discharge until a change in the comparator output value has occurred to a digital value which is corresponds to the measured temperature and available at the digital processing unit or one of its outputs. In essence, the temperature-measuring device will thus consist of a transducer, a comparator and a reference-voltage source, wherein the transducer consists of the temperature sensor proper and the capacitor charged by it. In a manner as known, and of no further essence for the functioning of the present invention, the temperature sensor will deliver a current proportional to the measured temperature to charge the capacitor which, controlled by the digital processing unit, e.g. a microprocessor, will discharge at the start of a measurement and for a period as predetermined in the digital processing unit.

It will be of particular advantage in discharging the capacitor if, according to a further aspect of this invention, provision is made for a discharging transistor which is connected to the capacitor, the base of which is connected to one output of the digital processing unit. The latter is so arranged in the circuit that, at the start of temperature measurement "logical 1" is applied to the base of the discharging transistor, whereby the capacitor will discharge for a predetermined period and then "logical 0" is applied to the base of the transistor. This represents a particularly simple circuit arrangement for obtaining the capacitor discharge as required at the start of each temperature measurement. The duration of the capacitor discharge is predetermined in the digital processing unit and is of a length sufficient for complete capacitor discharge before starting the charging process, as unequivocal measurment results can be obtained only in this manner.

The capacitor is connected to one input of a comparator formed, for instance, by an operational amplifier, with a reference voltage applied to the other input, comparison is effected therein between the reference voltage and the respective voltage delivered to the capacitor when charging the latter proportional to temperature. As soon as the temperature-proportional capacitor voltage has reached the reference voltage, the comparator will change its output signal value which is delivered through an appropriate connection to one input of the digital processing unit, e.g., the microprocessor.

The signal at the comparator output—which, due to complete capacitor discharge before the measurement and due to the predetermined reference voltage available when starting the measurement, will in any case always be of an identical, defined logical value—is checked for the change to the respective other logical value at equal time intervals determined by the digital processing unit, the checking commencing with the start of temperature measurement as set by the digital processing unit for the end of the discharging process. The aforesaid change, concomitant with the temperature-proportional capacitor voltage exceeding the reference voltage, will thus—caused by the temperature-proportional magnitude of the charging current—ensue at a very definite moment coinciding with the appropriate temperature at the temperature sensor. The number of comparator output-signal checks performed at equal time intervals by the digital processing unit until the change in the output signal occurs, may thus be taken as digital value corresponding to the temperature prevailing at the temperature sensor, and may subsequently be processed in an appropriate manner in the digital processing unit itself or at one of its outputs, respectively.

In a further modification of the present invention, the reference voltage is adjustable by a variable resistor at the reference-voltage source to allow temperature calibration of the temperature sensor. The output voltage of the reference-voltage source which is compensated to a great extent, at least in respect of fluctuations of ambient temperature and supply voltage, may thus be varied in a simple manner, whereby it will also be possible to take into account the different characteristics of temperature sensors as may be used.

According to a particularly advantageous further modification of this invention, provision is made for combining the capacitor, the discharging transistor, the reference-voltage source and the comparator into a measuring network located in the immediate proximity of the respective temperature sensor and connected via a control line to the digital processing unit.

This design of the requisite connection between the individual temperature sensors and the digital processing unit is of the decisive advantage that only logic signals will be transmitted via the control line between the measuring network and the digital processing unit, for which only two distinctly different voltage values are required, i.e., one each for "logical 0" and "logical 1", and this will preclude sensitivity to interference signals that may be fed in or to leakage currents such as may occur in the also possible direct transmission of the temperature-proportional current to a measuring network arranged at the digital processing unit. Use of suitable "line drivers", allowing commensurately higher differentials between the voltages assigned to the values of the both logical states, will allow laying also of non-shielded lines in great lengths, without having to accept a reduction in measuring quality.

According to a further aspect of the present invention, provision is also made to have the digital processing unit serve for linearization of the temperature/digital-value curve of the temperature sensor by arithmetical correction of the values as determined for individual temperatures. The charging time t until a reference voltage $U_{ref}$, set by way of the reference-voltage source, has been reached, is computed according to the following relations known of electrical engineering as:

$$t = \frac{U_{ref} \cdot C}{i},$$

wherein
C: capacitance of capacitor, and
i: temperature-proportional current supplied by the temperature sensor.

Since in a given conduit only the current i is a variable quantity on the right-hand side of the above equation, the temperature regulating system will suffer various disadvantages, since with the usually linear temperature/current characteristics of the temperature sensors as used, the digital value available at the digital processing unit during the charging period, is concatenated with the temperature-proportional current i by an essentially hyperbolic curve. Linearizing of this curve by way of an arithmetic correction performed by the digital processing unit, e.g., by deducting from the measured variables values put in for individual temperatures, will be a particularly simple available method and require only very limited additional expenditure when compared with the linearization methods in systems of prior art, wherein such methods were possible only at great expenditure for circuitry or not at all.

In a still further modification of this invention, provision is made for a fault-indicating device or, respectively, a fault-considering device, to be triggered by the digital processing unit in case the temperature-proportional digital value available from one of the temperature sensors deviates from a predetermined tolerance range. In the central processing unit of the regulating system a certain tolerance range in predetermined in digital-value format, and with the temperature sensor functioning correctly the signals delivered by the temperature sensors will fall within said tolerance range. A fault-indicating device and or a fault-considering device can thus be triggered if, due to the values delivered by the sensors falling beyond this tolerance range, a fault of the respective sensor or the transmission line may be assumed, so that the operating personnel will be alerted to the fault by, for instance, a signal lamp; or a fault that has been determined may be dealt with by deactivation of certain functions.

In dual-duct air conditioning plant or heating plant wherein the main duct carries air at a temperature governed by an external pilot sensor and wherein the secondary duct is carrying air at a temperature governed by an internal pilot sensor, the temperature regulating device according to this invention can be designed in a further modification so, that in case of a fault being detected in one of the pilot sensors, the fault-considering device will change the temperature-sensor assignment at the digital processing unit in such a manner that the next-relevant internal or external temperature sensor will serve as requisite pilot sensor for the control device. The fault-considering device serves herein directly for changing the sensor assignment, with "relevance" being determined by quantities-such as the degree of occupation of a railway compartment—as preset in the digital processing unit. It can thus be ensured that in case of failure of such a temperature sensor which is mainly responsible for temperature regulation, the functioning of the air conditioning plant or heating plant will still be maintained to a high degree.

According to a further aspect of the present invention, provision is made that the relationship between the air temperature in at least one of the two ducts and the temperature as measured by the sensors will ensue according to a non-linear curve as predetermined in the digital processing unit. This is a simple method available for utilizing the direct effect of the aforesaid curve upon the regulating characteristics of the air conditioning or heating plant including the regulating system, in order to influence the regulating characteristics as desired.

DESCRIPTION OF THE DRAWINGS

The present invention will be hereinafter explained more closely with reference to exemplary embodiments depicted schematically in the accompanying drawings, wherein.

DESCRIPTION OF THE PREFERRED EMBODIMENTS

Figure 1:
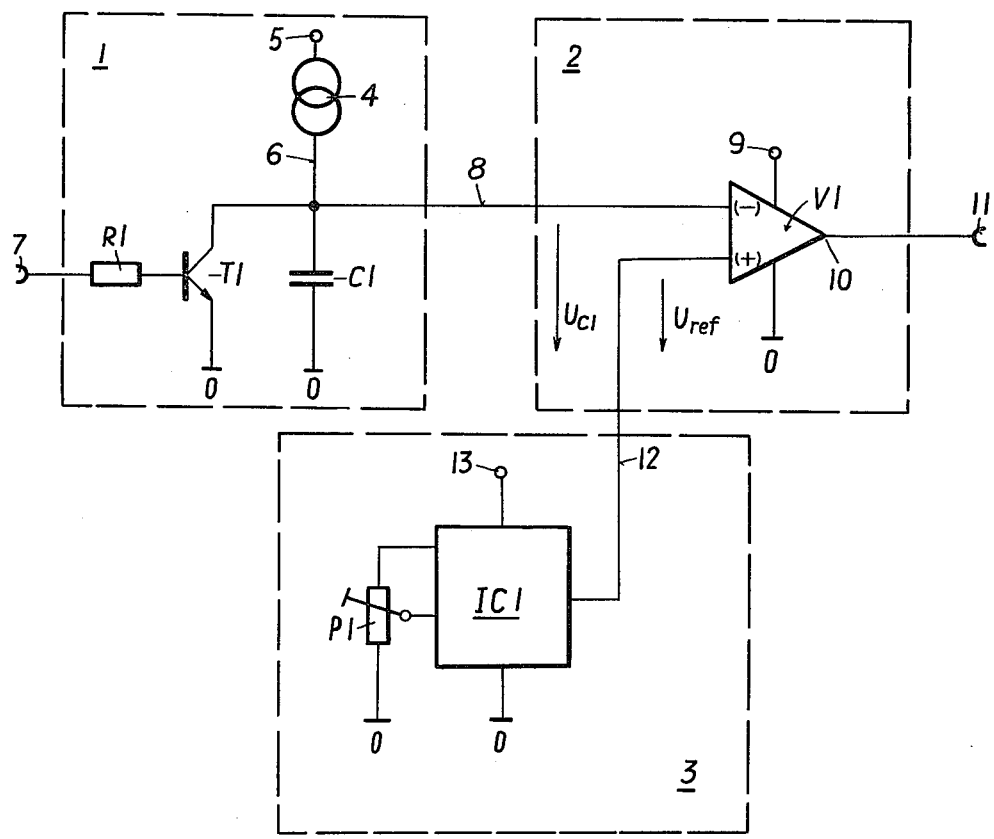
FIG. 1 shows a circuitry for a temperature-measuring device in a temperature regulating system according to the present invention.

The circuit arrangement for the temperature measuring device of FIG. 1, comprises three basic units, spatially divided therein for better clarity and enclosed by broken lines, i.e.: a transducer 1, a comparator 2 and a reference-voltage source 3. A digital processing unit, which is provided to interpret and control the temperature measurement described below by means of the depicted measuring device, is not necessary for understanding the depicted circuit arrangement and thus is not shown here, although in a certain sence it also constitutes a component of the temperature-measuring device.

The transducer 1 is provided with a temperature sensor 4, joined (not shown) through a connection 5 to the supply voltage required for its operation, and delivering via a line 6 a current proportional to the voltage prevailing at the locus of the temperature sensor 4. The temperature sensor 4 is connected via line 6 to a capacitor C1, which is thus charged proportional to the temperature prevailing at the locus of temperature sensor 4.

The capacitor C1 is furthermore connected to a discharging transistor T1 which is so arranged in the circuit that, upon application of a predetermined voltage to its base, the capacitor C1 will be discharged. The base of transistor T1 is connected via a resistor R1 to an output 7 of a digital processing unit (not shown herein).

The capacitor C1 is connected via a further line 8 to an inverting input (−) of comparator 2 which is formed by an operational amplifier V1 joined via connection 9 to the required supply voltage. A reference voltage $U_{ref}$ is applied to a non-inverting input (+) of the comparator. The output 10 of the operational amplifier V1 is applied to an input 11 of a digital processing unit (not shown) which, for instance, may be formed by a microprocessor.

The reference voltage $U_{ref}$ applied to the non-inverting input (+) of the operational amplifier V1 is supplied via line 12 by the reference-voltage source 3 which is provided with an integrated circuit IC1, the output voltage of which is temperature-compensated to a high degree and which is also capable of compensating for fluctuations in the supply voltage furnished via connection 13. For calibration of the reference voltage $U_{ref}$ supplied via line 12, provision is made for a variable resistor P1 in the reference-voltage source 3, which resistor can be adjusted in order to calibrate the temperature of the entire circuit.

The ground connections required for the components 1, 2, 3 are labelled with 0.

The sequence of a temperature measurement with the measuring device as shown is as follows:

At the start of the measurement a voltage value corresponding to "logical 1" is applied via output 7 of the digital processing unit (not shown) and via resistor R1 to the base of the discharging transistor T1 which will thus be activated and discharge the capacitor C1 over a period predetermined by the digital processing unit. In order to ensure precise and repeatable measuring results, the period for discharging capacitor C1 must be long enough for its complete discharge. Subsequently, a voltage value corresponding to "logical 0" is applied via output 7 of the digital processing unit to the base of the transistor T1 which will thus block and no longer permit discharging of capacitor C1. The capacitor C1 is then charged via temperature sensor 4 and line 6 with a current corresponding to the temperature prevailing at the respective locus of the temperature sensor. This charging sequence may be represented, in accordance with relations known from electrical engineering, by the following equation:

$$U_{C1} = \frac{i \cdot t}{(C1)},$$

wherein, $U_{C1}$ denotes the voltage prevailing at capacitor C1 at time t,
  i: the temperature-proportional current of temperature sensor 4 supplied via line 6,
  t: the time from the end of the discharging process of capacitor C1 and
  (C1): denoting herein the capacitance value of capacitor C1.

Using the reference voltage $U_{ref}$ delivered by the reference-voltage source 3 and the comparator 2, the respective voltage of capacitor C1, as applied via line 8 at the inverting input (−) of the operational amplifier V1, can be checked as to whether a certain value—this is $U_{ref}$ in the present instance—is being exceeded upward or downward. This is accomplished by the signal value of the output 10 of the amplifier V1, as applied to an input 11 of the digital processing unit (not shown), being checked by the digital processing unit for change, such checking commencing at the end of the discharging process of capacitor C1 and proceeding at predetermined equal time intervals. Since at the end of the discharging process of capacitor C1, an identical voltage value, i.e. "0," will always be applied at the inverting input (−) of operational amplifier V1, and since $U_{ref}$ will also not change, output 10 of operational amplifier V1 will at time t=0, always be of an identical logical value, this being herein "1". The moment at which voltage $U_{C1}$ at capacitor C1 has reached the magnitude of reference voltage $U_{ref}$ can be computed from the above equation as follows:

$$t = \frac{U_{ref} \cdot (C1)}{i}$$

Since it is only the current i that is variable on the right-hand side of this equation—variations ensuing via temperature sensor 4 dependent upon temperature—the period t until the voltage value $U_{C1}$ at capacitor $C_1$ has reached the reference voltage $U_{ref}$ will only depend upon the temperature at temperature sensor 4.

The logical signal applied at input 11 of the digital processing unit (not shown here) is checked for change at predetermined equal time intervals, and the number of samplings from the end of the capacitor discharge, i.e. t=0, until a change has occured in the comparator output value, will be directly assigned as digital value to the temperature prevailing at temperature sensor 4. The circuit design described herein represents a particularly simple means for temperature measurement if the signal proportional to the measured temperature is required in digital format, when, for instance, it is desired to further process the temperature-proportional signal in a digital processing unit, as is the case in the present invention. The precision of temperature measurement in the circuit arrangement described above will depend, apart from the absolute precision of all components used, only upon the pulse frequency of sampling for change made by the digital processing unit. A temperature resolution of 1/10° C. and an identical absolute accuracy may readily be attained by using in conjunction with the aforedescribed circuit arrangement electronic components as are available today.

The reference voltage $U_{ref}$ supplied by the reference-voltage source 3 may be changed by a different setting of variable resistor P1 in order to allow temperature calibration of the measuring device and also to compensate the unavoidable tolerances of the components used. To do so, the temperature sensor 4 is introduced into a medium of a constant temperature determined by a different method, and the resistor P1 is thereupon varied until a digital value, which commensurates with the prevailing temperature of the measured medium according to the program of the digital processing unit, has been read into the latter.

Figure 2:
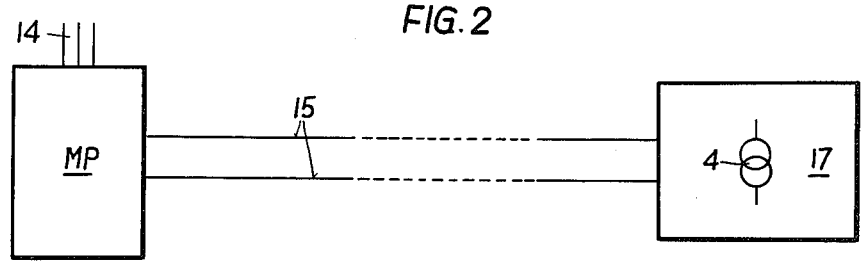
FIG. 2 shows a temperature-regulating system according to the invention.

FIG. 2 depicts one of the methods for signal transmission from the temperature sensor 4 proper to a microprocessor MP representing the digital processing unit which, governed by a program provided therein, will deliver from outputs 14 temperature-dependent regulating signals as required for the regulation of an air conditioning plant or a heating plant (not shown). A measuring network 17, designed for example according to FIG. 1, is located immediately at the respective temperature sensor 4; the changes in logic state which, in the manner described in detail with reference to FIG. 1 will initiate capacitor discharge and start temperature measurement, are transmitted via a control line 15 from the microprocessor to the measuring network 17, and the respective output value of the comparator 2 is fed back via a second pole of line 15. A pure pulse transmission is concerned herein; using suitable "line amplifiers" which can increase the voltage differential between "logical 1" and "logical 0" to, e.g., 24 Volts, will enable attaining of very great lengths of the control line without any loss of measurement quality.

Figure 3:
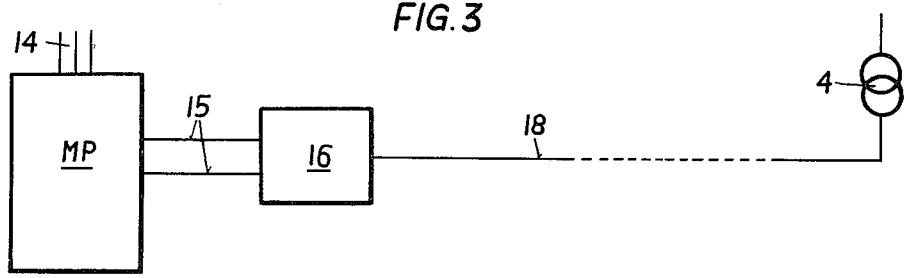
FIG. 3 shows a different embodiment of this invention.

Transmission of measured values may, however, also ensue as shown in FIG. 3. A measuring network 16 is located in the immediate proximity of microprocessor MP, so that control line 15 will be of very limited length, and a separate measuring line 18 is used through which the temperature-proportional current delivered by the temperature sensor 4 will flow. Measuring line 18 need not be shielded, since inductive interference need not be considered herein, as the transmission is made in the form of a current. Great lengths of the measuring line may also be attained herein, as long as attention is being paid that leakage currents, which are caused in the main by plug connections or similar, will remain negligible relative to the measuring current as such.

Figure 4:
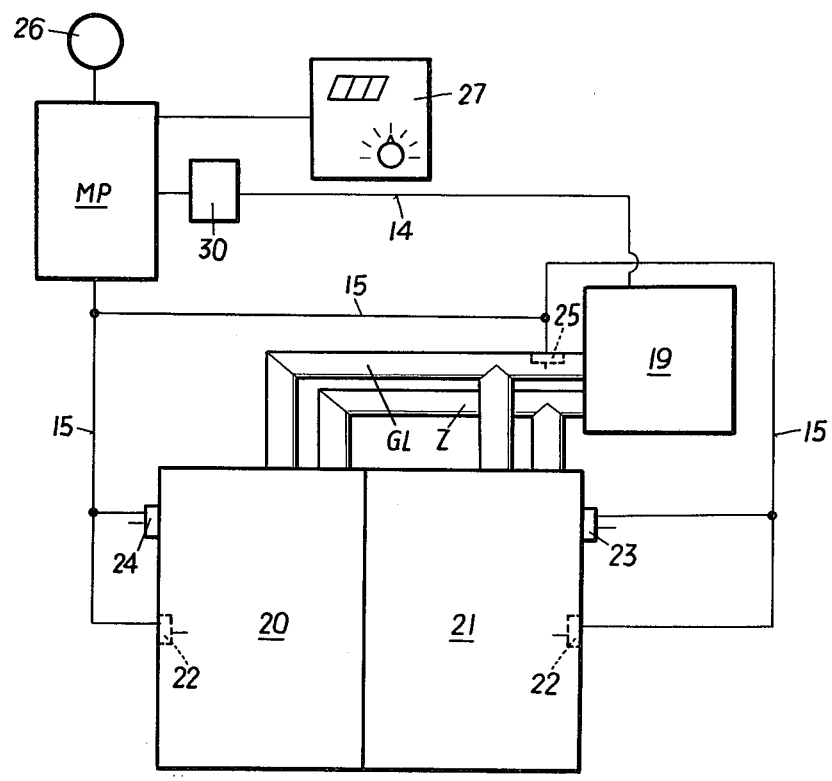
FIG. 4 shows an arrangement of a dual-duct air conditioning plant with a temperature-regulating system according to the present invention.

The embodiment shown in FIG. 4 depicts a dual-duct air conditioning plant 19 which is provided with a temperature-regulating system according to this invention, the plant 19 serving to air condition rooms 20, 21 via a main duct GL and a secondary duct Z. Rooms 20, 21 are each provided with one respective internal-temperature sensor 22. Further provided are external-temperature sensors in the form of a shaded-area sensor 23 and also a roof sensor (sunlight) 24. A sensor 25 in the main duct GL serves for preliminary regulation of the main-duct air. The sensors are connected to the microprocessor MP by means of control lines 15. The control signals, which are formed on basis of temperature values read-in by the aforenoted method and serving for the air conditioning plant 19, are transmitted, galvanically isolated by a relay 30, via outputs 14. If the microprocessor detects (in the manner as described) that a failure has affected a temperature sensor, it will activate a fault-indicating unit 26 and will also indicate with the aid of a monitoring unit 27 which sensor has become defective, or, respectively, which substitute sensor has been switched to by the fault-considering device located in the microprocessor.

I claim:

1. A temperature-regulating system for an air conditioning or heating plant which includes
a programmable digital processing unit which includes at least one input and at least one output, and
a value-measuring unit which includes at least one temperature sensor, a capacitor, a switching element, a switching means and a reference voltage-generating means, each temperature sensor being connected to a capacitor so as to charge the capacitor by a current proportional to the measured temperature, the switching element being connected to the output of the digital processing unit and to the capacitor so as to cause the capacitor to discharge at a rate determined by the digital processing unit, the switching means including an output connected to the input of the digital processing unit and two inputs, the capacitor being connected to one input of the switching means and the other input of switching means being connected to the reference voltage-generating means, the digital processing unit acting via the switching element to discharge the capacitor and also repeatedly checking the output of the switching means for a signal change, the number of such checks commencing from the beginning of measurement to a change in the signal representing digital values corresponding to the measured temperature, the switching means changing its output signal when the capacitor voltage reaches the reference voltage.

2. The temperature-regulating system as defined in claim 1 wherein the switching element is a discharging transistor, the base of which is connected via an electrical line to the output of the digital processing unit, and wherein the digital processing unit applies first a voltage "logical 1" to the discharge over a predetermined period and then a voltage "logical 0".

3. The temperature-regulating system as defined in claim 2 wherein said digital processing unit is a microprocessor.

4. The temperature-regulating system as defined in claim 2 wherein the reference voltage-generating means includes a variable resistor which acts to adjust the reference voltage supplied to the switching means and thus provides a calibration for the temperature-regulating system.

5. The temperature-regulating system as defined in claim 1 including multiple value-measuring units.

6. The temperature-regulating system as defined in claim 5 which is useful in conjunction with an air conditioning plant which supplies air to a number of rooms via a main duct and a supplementary duct, wherein the temperature-regulating system includes a fault-detecting means associated with the digital processing unit, and wherein the multiple value-measuring units of the temperature-regulating system include several external value-measuring units located outside of said rooms for determining the temperature of the air to be supplied to the rooms through the main duct and an internal value-measuring unit located inside each respective room for determining the temperature of the air to be supplied to the rooms through the supplementary duct, one of the external value-measuring units acting as an initially designated external pilot value-measuring unit for the digital processing unit and one of the internal value-measuring units acting as an initially designated internal pilot value-measuring unit for the digital processing unit, said fault-detecting means causing the microprocessor to change the external and internal value-measuring units acting as the pilot value-measuring units when the signals from the initially designated pilot value-measuring units deviate outside a predetermined tolerance range.

* * * * *